United States Patent [19]
Miller et al.

[11] Patent Number: 5,909,525
[45] Date of Patent: Jun. 1, 1999

[54] ELECTRO-OPTICAL RELAY

[76] Inventors: Jack V. Miller; Ruth Ellen Miller, both of R.R. 4 Box 748, Seaford, Del. 19973

[21] Appl. No.: 08/906,985

[22] Filed: Aug. 6, 1997

[51] Int. Cl.[6] .................................................. G02B 6/38
[52] U.S. Cl. .................. 385/73; 385/58; 385/16
[58] Field of Search .................. 385/73, 58, 15–23, 385/31, 44, 115, 116, 57

[56] References Cited

U.S. PATENT DOCUMENTS

| 4,030,810 | 6/1977 | Khoe ........................................... 385/73 |
| 5,812,715 | 9/1998 | Tiemeijer et al. ........................ 385/73 |

*Primary Examiner*—Phan T. H. Palmer

[57] ABSTRACT

A fiber optic relay for an individual light guide according to the present invention includes a first light guide from a remote source of illumination, which is coupled to second light guide in series by a relay having a light shut-off means including an electro-magnetic solenoid. In a preferred embodiment the light is fully off when the solenoid is de-energized and has the solenoid plunger disposed between the first and second light guides, blocking light transmission from the first light guide to the second light guide. When the solenoid is energized from a remote source of electrical power the solenoid plunger is withdrawn from between the first and second light guides, allowing light from the first light guide to pass into the second light guide with low attenuation and high efficiency.

9 Claims, 1 Drawing Sheet

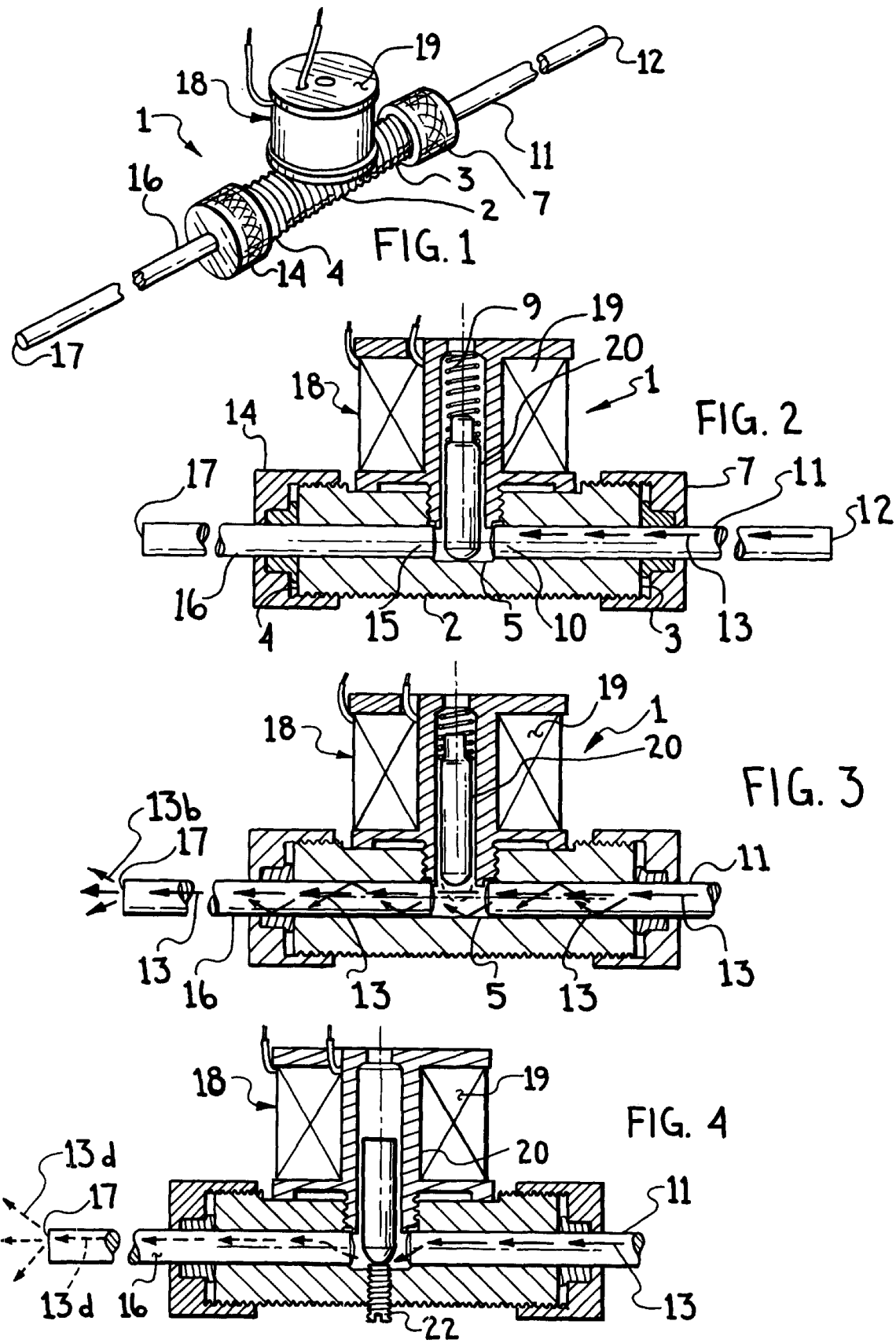

ELECTRO-OPTICAL RELAY

BACKGROUND - FIELD OF THE INVENTION

This invention applies to the field of fiber optic lighting, and in particular to programmable lighting requiring switched or moving light patterns. This also includes the field in interactive lighting, whereby a person is able to select an object or area to be illuminated, or in which a recorded program can sequentially illuminate different portions of a display.

BACKGROUND - DISCRIPTION OF PRIOR ART

Moving fiber optic light patterns are presently produced projection of an image onto the input end of a small rectilinear bundle of fiber optic light guides. Then the free output end of each light guide is positioned in a coherent but larger recilinear pattern. Changing the projected image on the input ends of the fibers in the bundle results in a larger moving pattern of light from the output ends of the fibers. Thus it is possible to create changing word patterns or animated pictures on large signs and displays.

Presently-known methods for changing light output image is to project a light image onto a rectilinear bundle of fiber optic light guides with some form of projector; such as a slide projector, rotating wheel with changing patterns or successive images, or a computer-operated transparent liquid crystal cell. The principal disadvantages of these prior-art methods is the limited brightness of the overalll system, as the imaging means severely attenuates the light before it enters the light guide. Another disavantage is the limited life of the image-producing device in the intense heat, light and ultraviolet of a focussed projection lamp.

OBJECTS AND ADVANTAGES

The primary purpose of the present invention is to provide a fiber optic relay for an individual light guide in which the light guide can be fully off or fully on with only slight attenuation, whereby very high intensity light is transmitted through a switchable light guide. A further purpose of the invention is to provide a fiber optic relay capable of electrically switching a fiber optic light guide from a dim condition to a bright condition. The advantages of achieving these objects is to provide selective illumination of signs, animated graphics and interactive displays in which individual fiber-optic light guides can be switched from off to on, or from dim to bright, from electrical inputs.

BRIEF DESCRIPTION OF THE INVENTION

The foregoing purpose is achieved by a fiber optic relay for an individual light guide according to the present invention in which a first light guide from a remote source of illumination is coupled to second light guide in series by a relay including an electromagnetic actuator, such as a solenoid. In a first preferred embodiment the light is fully off when a solenoid is de-energized and has a plunger disposed between the first and second light guides, blocking light transmission from the first light guide to the second light guide. When the solenoid is energized from a remote source of electrical power the solenoid plunger is withdrawn from between the first and second light guides, allowing light from the first light guide to pass into the second light guide with low attenuation and high efficiency. In a second preferred embodiment the light is not fully off when a solenoid is de-energized and the plunger may be adjusted to partially blocking light transmission from the first light guide to the second light guide, wherby the relay switches from a dim to a bright condition.

BRIEF DESCRIPTION OF THE DRAWINGS

FIG. 1 is an exterior perspective view of a firstpeferred embodiment of a fiber-optic relay according to the present invention;

FIG. 2 is a side cross-sectional view of the fiber-optic relay of FIG. 1, shown in the "OFF" position; and FIG. 3 is a side cross-sectional view of the fiber-optic relay of FIG. 1, shown in the "ON" position.

FIG. 4 is a side cross-sectional view of a second preferred embodiment, shown in a "DIM" position.

DETAILED DESCRIPTION OF THE DRAWINGS

In FIG. 1 a first preferred embodiment of a fiber optic relay 1 according to the invention is shown having a tubular coupling body 2 having a first end 3, and a second end 4. A first fiber-optic light guide 11, having a remote end 12, is retained in body 2 by a first retaining means 7; and a second fiber-optic light guide 16, having a remote end 17, is retained in body 2 by a second retaining means 14. An light shut-off means 18 includes an actuator means 19 blocking or transmitting light from the first fiber-optic light guide 11 to the second fiber-optic light guide 16.

In FIG. 2 a fiber optic relay 1 according to the invention is shown having a tubular coupling body 2 having a first end 3, a second end 4 and a hole 5 therethrough from said first end 3 through said second end 4; a first retaining means 7, shown as a collet, retains a first end 10 of first fiber-optic light guide 11 within hole 5. First fiber-optic light guide 11 receives light 13 from remote second end 12 at a remote source of illumination which is not shown. A second retaining means 14 retains a first end 15 of a second fiber optic light guide 16 within hole 5. Second fiber-optic light guide 16 has a remote second end 17. A light shut-off means 18 is disposed between respective first ends of the first and second fiber optic light guides. The light shut-off means 18 includes a magnetically-movable plunger 20, which is shown urged into a "NORMALLY-OFF" postition by spring 9, blocking light 13 coming through first light guide 11 from entering light guide 16. Thus, the fiber optic relay of FIG. 2 is shown in the "OFF" position, wherein plunger 20 has a hemispherical end 20a, fitting closely into the lower-half diameter of hole 5 to shut off the pasage of light.

In FIG. 3 fiber optic relay 1 is shown with light shut-off means 18 electrically energized from a remote source of power which is not shown. Thus, actuator 19, shown as an electromagneic coil, retracts solenoid plunger 20 by pulling it into the "ON" position. Plunger 20, being withdrawn from the space between respective first ends of the light guides, permits light 13 to pass efficiently into and through second light guide 16 to be emitted from remote end 17 as bright light 13b. Since light travels substantially off-axis through fiber-optic light guides, it emerges from light guide 11 within the body in a conical beam. Thus hole 5 is made internally reflective to minimize light loss between the respective first fibers.

In FIG. 4 a second preferred embodiment 21 of a fiber optic relay is shown with light shut-off means 18 electrically de-energized. Thus actuator means 19, shown as an electromagneic coil, releases plunger 20; which is biased by gravity to move from the "ON" position of FIG. 3 towards the "OFF" position in FIG. 2. However, the embodiment of FIG.

4 includes an adjustment means 22, shown as set screw 22, stopping plunger 20 at a selected "DIM" position. Plunger 20, being prevented from moving to "OFF" permits a limited amount of light 12 to enter light guide 16, creating an adjustable amount of dimmed light 13d to be emitted at remote end 17 of second fiber-optic light guide 16.

REFERENCE NUMERALS IN THE DRAWINGS

| | |
|---|---|
| 1 | first embodiment relay |
| 2 | body |
| 3 | body first end |
| 4 | body second end |
| 5 | hole through body |
| 7 | first retaining means |
| 10 | first end of first light guide |
| 11 | first fiber-optic light guide |
| 12 | first light guide remote end |
| 13 | light |
| 13b | emitted bright light |
| 13d | emitted dim light |
| 14 | second retaining means |
| 15 | first end, second light guide |
| 16 | second fiber optic light guide |
| 17 | remote end of second light guide |
| 18 | light shut-off means |
| 19 | shut-off actuator |
| 20 | solenoid plunger |
| 21 | second embodiment relay |
| 22 | dim level set screw |

OPERATION

In a preferred embodiment the light is fully off when the actuator means is de-energized and has a normally-off opaque shut-off means disposed between the first and second light guides, blocking light transmission from the first light guide to the second light guide. When the actuator means is energized from a remote source of electrical power, the shut-off means is removed from between the first and second light guides, allowing light from the first light guide to pass into the second light guide with low attenuation and high efficiency. In a second preferred embodiment the opaque shut-off means does not fully shut off the light from the first light guide, but remains in a dim de-energized position in which an adjustable amount of light is transmitted to and through the second light guide, and the light is fully trasnsmitted to and through the second light guide in the energized condition.

SUMMARY, RAMIFICATIONS AND SCOPE

The objects of the invention are achieved by a fiber-optic relay for a fiber-optic light guide, in which a first fiber-optic light guide from a remote source of illumination is coupled to second light guide in series by a relay including a light shut-off means in the form of electromagnetic actuator. In a first preferred embodiment the relay can switch an individual fiber-optic light guide from fully "OFF" to a fully "ON" bright condition. In a second preferred embodiment the relay can switch an individual fiber-optic light guide from a substantially-"OFF" dim condition to the fully-"ON" bright condition.

Achievment of the stated objects provides the ability to electrically program arrays of light guides in either static or dynamic sequences. It further provides the ability to group adjacent light-emitting ends of fibers in different colors, whereby selective illumination of different primary colors can create various changing metameric colors in a display.

It will be obvious to one skilled in the art that other electro-mechanical actuator constructions used in electrical relays, signals and semaphores are applicable to the present invention, and are considered with the scope of the disclosure.

We claim:

1. A fiber optic relay including:

a tubular coupling body having a first end, a second end and a hole therethrough;

a first means for retaining a first end of a fiber-optic light guide within the hole through said body, said first fiber-optic light guide receiving light at a second end from a remote source of illumination;

a second means for retaining a first end of a second fiber-optic light guide within the hole through said body, said second fiber-optic light guide having a remote second end;

a light shut-off means disposed in a space between respective first ends of the first and second fiber optic light guides, said light shut-off means being electrically movable by an actuator from an orientation blocking transmission of light to an orientation permitting light transmission from the first end of the first fiber optic light guide to the first end of the second fiber optic light guide when said light shut-off means is energized by a remote source of electrical power.

2. A fiber optic relay according to claim 1 in which the light shut-off means is an electric solenoid transversely disposed on the tubular body.

3. A fiber optic relay according to claim 2 in which the solenoid has a plunger urged into a space between the respective first ends of the first and second fiber optic light guides, said solenoid having an actuator withdrawing said plunger from said space when energized by a remote source of electrical power, permitting light to flow from the first light guide, into and through the second light guide.

4. A fiber optic relay according to claim 3 in which the solenoid plunger resiliently urged into contact with a transverse adjusting screw in the space between the respective fiber optic light guides, said adjusting screw limiting the solenoid from fully closing the space between the first and second fiber ends.

5. A fiber optic relay according to claim 3 in which the solenoid plunger has a hemispherical end congruent with half the circumference of the hole through the body.

6. A fiber optic relay according to claim 3 in which the solenoid plunger is resiliently urged into the space between the respective fiber optic light guides by gravity.

7. A fiber optic relay according to claim 3 in which the solenoid plunger is resiliently urged into the space between the respective fiber optic light guides by a spring.

8. A fiber optic relay according to claim 1 in which the means for retaining each respective first light guide first end is a collet chuck threadably engaged onto the body.

9. A fiber optic relay according to claim 1 in which the portion of the through hole in the body, comprising the space between the respective first ends of the first and second fiber optic light guides has reflective walls.

* * * * *